(12) United States Patent
Kosaka (10) Patent No.: US 10,182,179 B2
(45) Date of Patent: Jan. 15, 2019

(54) IMAGE FORMING METHOD FOR PRIVATE OUTPUT USING MOBILE TERMINAL (71) Applicant: Kyocera Document Solutions Inc., Osaka (JP)

(72) Inventor: Naohiko Kosaka, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/421,376

(22) Filed: Jan. 31, 2017

(65) Prior Publication Data
US 2018/0220041 A1 Aug. 2, 2018

(51) Int. Cl.
*B41M 3/14* (2006.01)
*B42D 25/309* (2014.01)
*H04N 1/44* (2006.01)
*H04N 1/00* (2006.01)
*H04N 1/32* (2006.01)
*G06F 3/12* (2006.01)
*H04W 4/12* (2009.01)

(52) U.S. Cl.
CPC .......... *H04N 1/442* (2013.01); *G06F 3/1222* (2013.01); *G06F 3/1238* (2013.01); *H04N 1/00307* (2013.01); *H04N 1/00344* (2013.01); *H04N 1/00896* (2013.01); *H04N 1/32101* (2013.01); *H04W 4/12* (2013.01); *H04N 2201/0094* (2013.01); *H04N 2201/3205* (2013.01)

(58) Field of Classification Search
USPC .................. 358/1.1–3.29, 1.11–1.18, 464
See application file for complete search history.

(56) References Cited

U.S. PATENT DOCUMENTS

| 8,797,573 | B2 | 8/2014 | Kamei et al. |
| 2006/0039025 | A1* | 2/2006 | Krolczyk ............... G06F 3/1205 358/1.15 |
| 2008/0010079 | A1* | 1/2008 | Genda ................ H04N 1/00326 358/1.15 |
| 2009/0284790 | A1* | 11/2009 | Ohashi .................... G06F 21/35 358/1.15 |
| 2013/0194623 | A1* | 8/2013 | Tecu ...................... G06F 3/1204 358/1.15 |
| 2016/0306596 | A1* | 10/2016 | Yasuda ................. G06F 3/1226 |

FOREIGN PATENT DOCUMENTS

| JP | 2015-200989 A | 11/2015 |
| JP | 2015-228163 A | 12/2015 |

* cited by examiner

Primary Examiner — Marcellus Augustin
(74) Attorney, Agent, or Firm — HEA Law PLLC (57) ABSTRACT An image forming method includes: sending a print job and a print job ticket including user ID data from a terminal to an image forming apparatus and sending the print job ticket to a mobile terminal; receiving the print job ticket by the image forming apparatus; waiting for an access from a mobile terminal having the user ID data using a wireless communication in a specified range from the image forming apparatus; authenticating for accessing the print job ticket in the image forming apparatus using the user ID data; acquiring a facial image of a user in front of the image forming apparatus in response to the authentication; recognizing a face of an owner of the print job ticket in the acquired facial image to cause the image forming apparatus to print the image data; and printing the image data while the facial image is being recognized.

15 Claims, 6 Drawing Sheets

IMAGE FORMING METHOD FOR PRIVATE OUTPUT USING MOBILE TERMINAL

BACKGROUND

Unless otherwise indicated herein, the description in this section is not prior art to the claims in this application and is not admitted to be prior art by inclusion in this section.

This disclosure is related with an image forming technique for privately outputting printed matters, which is referred to as private printing. Recently, various techniques for privately outputting printed matters have been proposed. A typical technique provides a printing method that requires input of password at an image forming apparatus. However, the inputting of password bothers users, and the user cannot leave the image forming apparatus after inputting the password.

SUMMARY

An image forming method according to one aspect of the disclosure includes: sending a print job including image data and a print job ticket including user ID data from a terminal to an image forming apparatus and sending the print job ticket from the terminal to a mobile terminal; receiving the print job and the print job ticket by the image forming apparatus; waiting for an access from the mobile terminal having the user ID data of the sent print job ticket in the mobile terminal using a wireless communication in a specified range from the image forming apparatus; authenticating for accessing the print job ticket in the image forming apparatus using the user ID data in the mobile terminal; acquiring a facial image of a user in front of the image forming apparatus in response to the authentication; recognizing a face of an owner of the print job ticket in the acquired facial image to cause the image forming apparatus to print the image data; and printing the image data while the facial image is being recognized.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure (hereinafter referred to as, the "embodiments") with reference to the drawings.

A. First Embodiment

Figure 1:
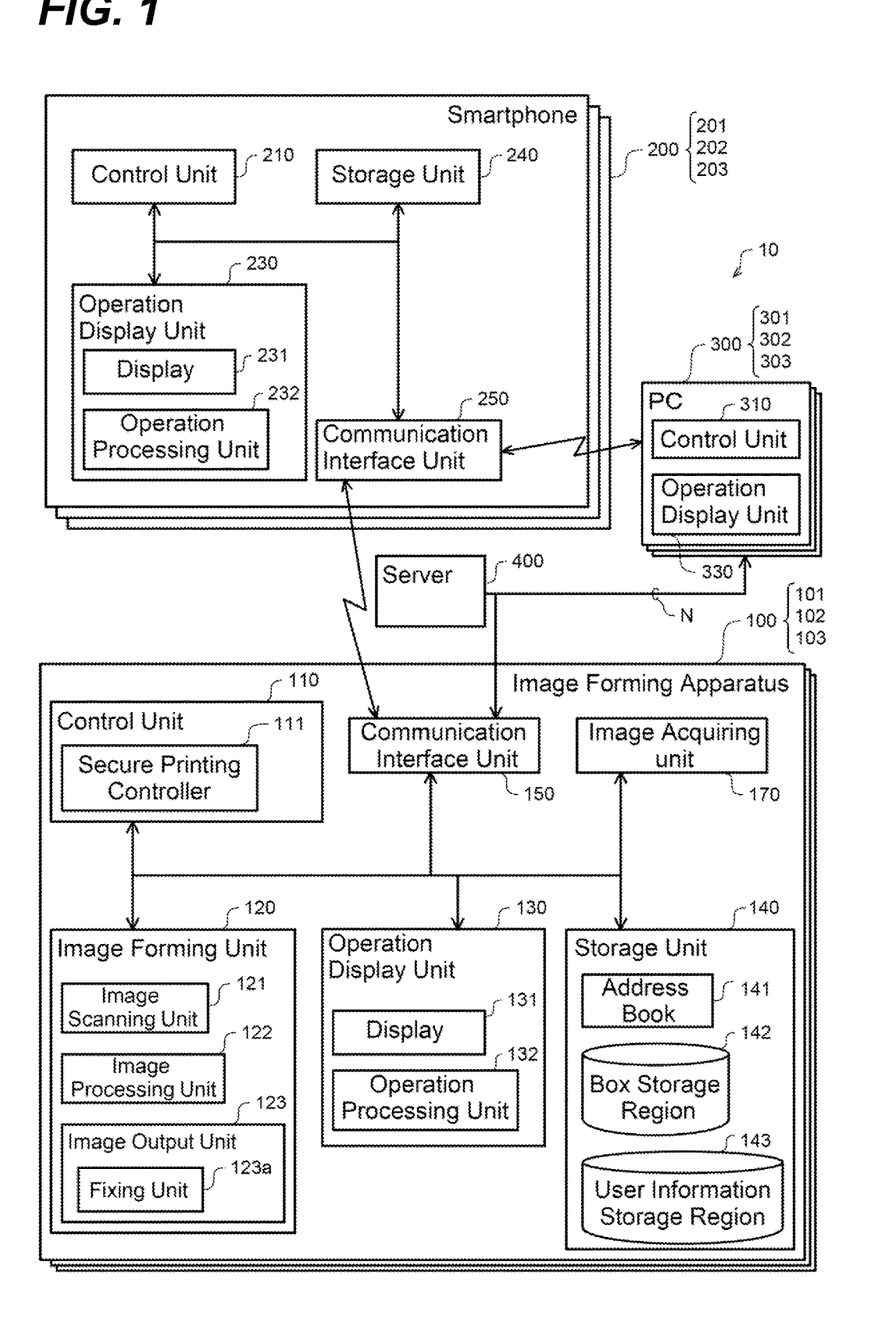
FIG. 1 illustrates a block diagram representing a functional configuration of an image forming system according to a first embodiment of the disclosure.

FIG. 1 illustrates a block diagram representing a functional configuration of an image forming system 10 according to one embodiment of the disclosure. The image forming system 10 includes image forming apparatuses 100 (101, 102, and 103), smartphones 200 (201, 202, and 203), personal computers 300 (301, 302, and 303), and a server 400. The personal computers 300 and the server 400 are connected to the image forming apparatuses 100 via a network, which is a LAN in this example. The smartphones 200 are connected to the image forming apparatuses 100 via a wireless communication such as, Wi-Fi compliant with IEEE 802.11a/b/g/n/ac including Wi-Fi Direct, and a BLUETOOTH (registered trademark).

The image forming apparatuses 100 includes a control unit 110, an image forming unit 120, an operation display unit 130, a storage unit 140, and a communication interface unit 150, and an image acquiring unit 170. The smartphone 200 includes a control unit 210, an operation display unit 230, a storage unit 240, and a communication interface unit 250. The personal computer 300 includes a control unit 310 and an operation display unit 330.

The communication interface unit 150 and the communication interface unit 250 communicate using, for example, a transmission control protocol/internet protocol (TCP/IP) suite.

The image forming unit 120 includes an image scanning unit 121, an image processing unit 122, and an image output unit 123 with a fixing unit 123*a*. The image scanning unit 121 reads an image from a document to generate scan data. The image processing unit 122 processes the scan data in accordance with a print setting. The image output unit 123 prints on a printing medium based on the processed scan data.

The operation display unit 130 of the image forming apparatuses 100 includes a display 131 and an operation processing unit 132. The operation display unit 230 of the smartphones 200 includes a display 231 and an operation processing unit 232. The display 131, which functions as a touch panel, displays various menus as a receiving screen. The operation processing units 132 and 232 accept an input operation of a user from the display 131, which functions as a touch panel, and various kinds of buttons and switches (not illustrated).

The control units 110 and 210 include a main storage unit such as a RAM and a ROM, and a control unit such as a micro-processing unit (MPU) and a central processing unit (CPU). The control units 110 and 210 also have a controller function related to an interface such as various kinds of I/Os, a universal serial bus (USB), a bus, and other hardware, and control the entire image forming apparatus 100 and the entire smartphone 200, respectively.

The storage units 140 and 240 are storage devices formed of such as a hard disk drive and a flash memory, which are non-transitory recording mediums, and store control programs and data of processes performed by the control units 110 and 210, respectively.

The storage unit 140 further includes an address book 141, a box storage region 142, and a user information storage region 143. A storage region available for each user of the image forming apparatus 100 is allocated in the box storage region 142. The user information storage region 143 stores pieces of personal information, such a password for authentication and a facial image of each user, associated with the user recorded in the address book 141. The image acquiring unit 170 is a camera that acquires a facial image of a user in front of the image forming apparatuses 100.

Figure 2:
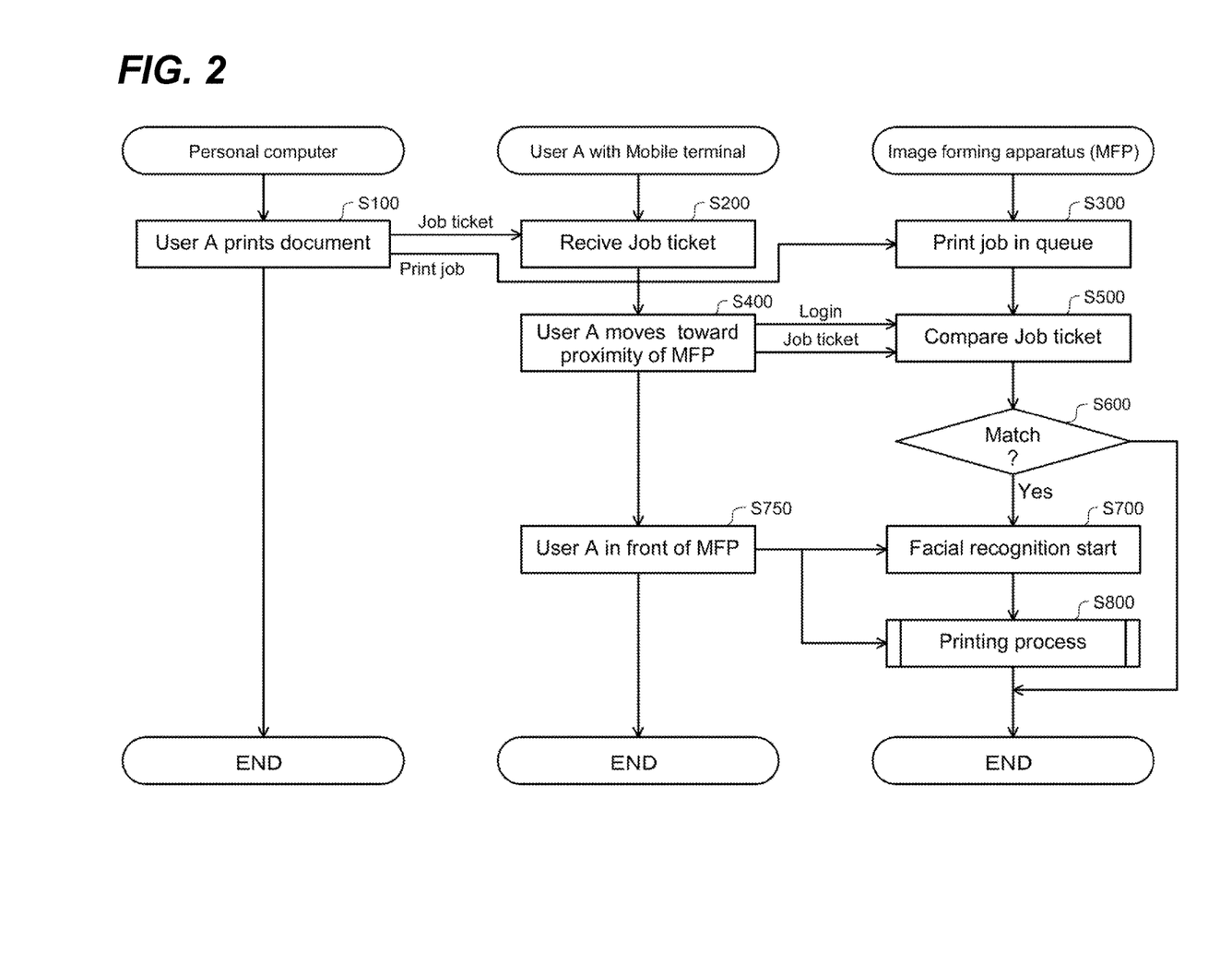
FIG. 2 illustrates a flow chart representing an image forming method according to the first embodiment.

FIG. 2 illustrates a flow chart representing an image forming method according to the first embodiment. At Step S100, User A instructs to print a document on the operation display unit 330 of the personal computer 301 the user of which is User A. Specifically, User A sets printing options including a selection of one of the image forming apparatuses 101 to 103 and an output method of private printing or secure printing. The private printing ensures an output of a printed matter privately for its job owner.

In this case, User A selects one of the image forming apparatuses 101 to 103 and the option of private printing. The control unit 310 of the personal computer 301 prepares a print job based on the setting including the option of the private printing and the selection of the image forming apparatuses 100. The control unit 310 creates a print job ticket, which is a ticket as a data file for performing a private printing job and also simply referred to as job ticket, based on the option of the private printing.

The print job ticket may be constituted, for example, as a simple object access protocol (SOAP) message or an extensible markup language (XML) file. The SOAP message of the print job ticket is a data file that has a SOAP envelope including a SOAP main body. The SOAP main body includes the selected image forming apparatus 101 and user information or user ID data including login information for the user. The user information is information that has been recorded in the address book 141 in each of the image forming apparatuses 100.

At Step S200, the personal computer 301 transmits the print job ticket to the smartphone 201 of User A via the wireless communication. The personal computer 301 receives acknowledgement of the reception of the print job ticket from the smartphone 201.

At Step S300, the personal computer 301 transmits the print job and the print job ticket (which may be in a configuration of the print job with the embedded print job ticket) to the image forming apparatus 101, which is also simply referred to as an MFP 101 or MFP_A, via the LAN. The personal computer 301 receives acknowledgement of the reception of the print job from the image forming apparatus 101. Alternatively, the personal computer 301 may transmit the print job ticket separately from the print job.

In the embodiment, the two print job tickets are transmitted from the personal computer 301, one of the two print job tickets is transmitted to the smartphone 201 of User A while the other one of the two print job tickets is transmitted to the selected image forming apparatus 101 along with the print job or separately from the print job.

The personal computer 301 starts waiting for an access from the smartphone 201 via the wireless communication. Alternatively, the print job ticket may be sent using, for example, an xml file while the print job is separately sent using the hypertext transfer protocol (HTTP).

At Step S400, User A with the smartphone 201 moves toward the image forming apparatus 101. When User A moves in a specified range from the image forming apparatus 101, the smartphone 201 automatically log in the image forming apparatus 101 and then transmits the print job ticket, which is transmitted from the personal computer 301, to the image forming apparatus 101. The specified range may be a range where the smartphone 201 is connectable to the image forming apparatus 101 via the wireless communication. The image forming apparatus 101 receives the print job ticket from the smartphone 201.

At Step S500, the image forming apparatus 101 compares the print job ticket from the smartphone 201 with the print job ticket transmitted from the personal computer 301. If the print job ticket from the smartphone 201 matches the print job ticket transmitted from the personal computer 301, the control unit 110 advances the process to Step S700 (Step S600). If the print job ticket from the smartphone 201 does not match the print job ticket transmitted from the personal computer 301, the control unit 110 ends the process (Step S600).

At Step S700, the image forming apparatus 101 initiates the image acquiring unit 170 to acquire a facial image of the user in front of the image forming apparatus 101 for facial recognition. The control unit 110 attempts to perform the facial recognition using facial features from the facial image of User A stored in the user information storage region 143. Meanwhile, the image processing unit 122 starts performing raster image processing (RIP) to produce a raster image also known as a bitmap. At Step S750, User A with the smartphone 201 comes in front of the image forming apparatus 101.

At Step S800, the control unit 110 switches operating modes from a power saving operating mode to an ordinary operating mode and then start immediately after the match in Step S600 while the processing of Step S700 are performed. Alternatively, a value of RSSI (which will be described later) may also be used for controlling timing for the control unit 110 to switch the operating modes for accurate power saving. The power saving operating mode consumes a less power than the ordinary operating mode where the fixing unit 123a is turned on to be ready for outputting printed matters.

Figure 3:
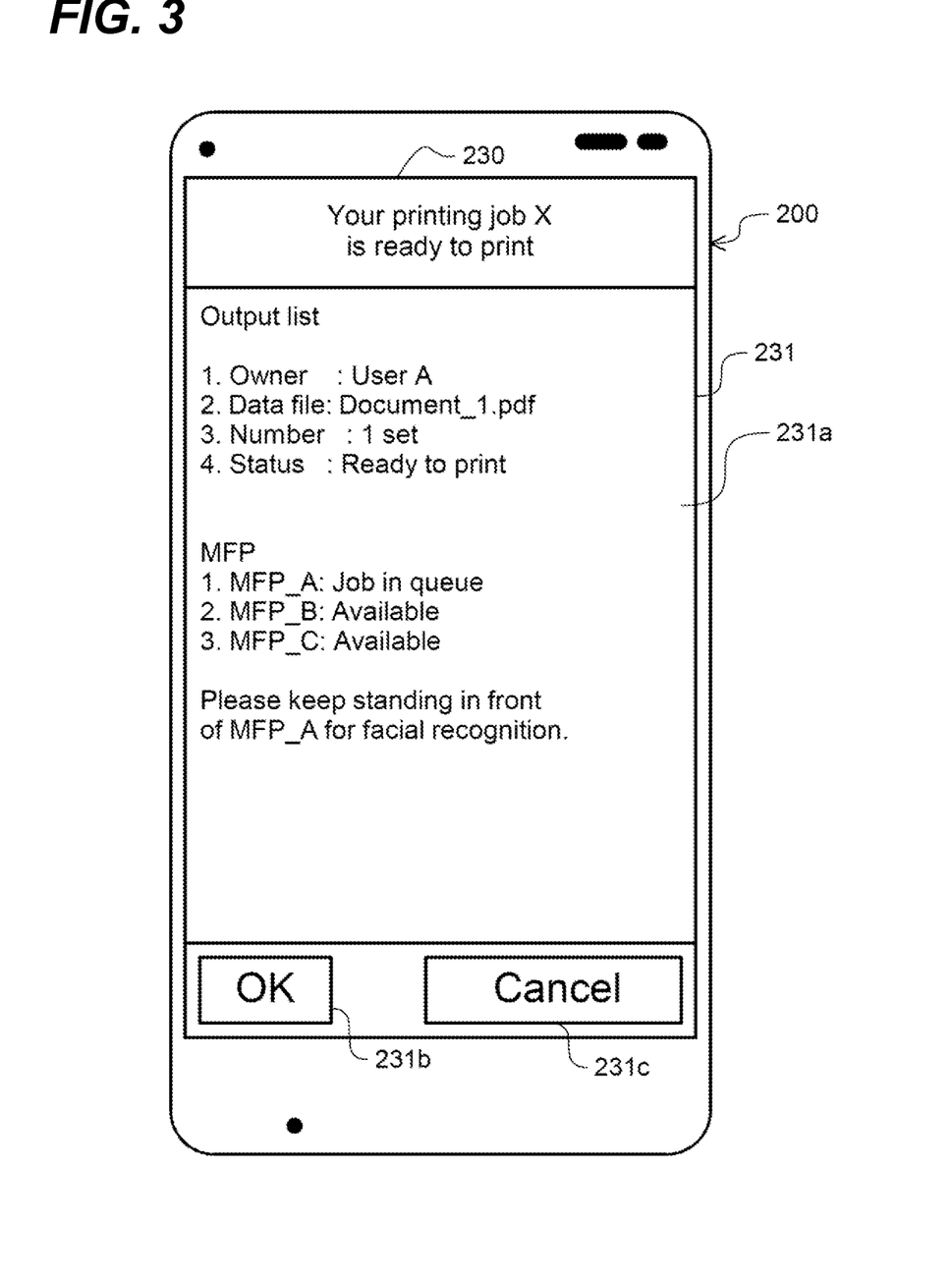
FIG. 3 illustrates a user interface screen on an operation display unit according to the first embodiment.

FIG. 3 illustrates a user interface screen 231a displayed on an operation display unit 230 according to the first embodiment. The control unit 110 causes the smartphone 201 to perform a push notification by vibrating and showing the user interface screen on the display 231 of the smartphone 201 as illustrated in FIG. 3. Alternatively, the control unit 110 sends an e-mail or a message using a message send protocol (MSP).

The user interface screen 231a indicates an output list, status of MFPs, and an Instruction for User A. In this case, following pieces of information are displayed. The output list indicates the owner, a data file, copy number, and a status, which may include the number of printed pages/total pages, of the print job. The status of MFPs indicates that the MFP_A has the print job in its queue and the MFP_B and the MFP_C are available for the print job. The Instruction includes "Please keep standing in front of MFP_A for facial recognition."

The user interface screen 231a also indicates an OK icon 231b and a cancel icon 231c. If User A touches the cancel icon 231c, the smartphone 201 transmits an instruction to the image forming apparatus 101 for causing the image forming apparatus 101 to cancel the print job. If User A touches the OK icon 231*b*, the smartphone 201 transmits an instruction to the image forming apparatus 101 for causing the image forming apparatus 101 to start outputting the print job (Step S810).

Figure 4:
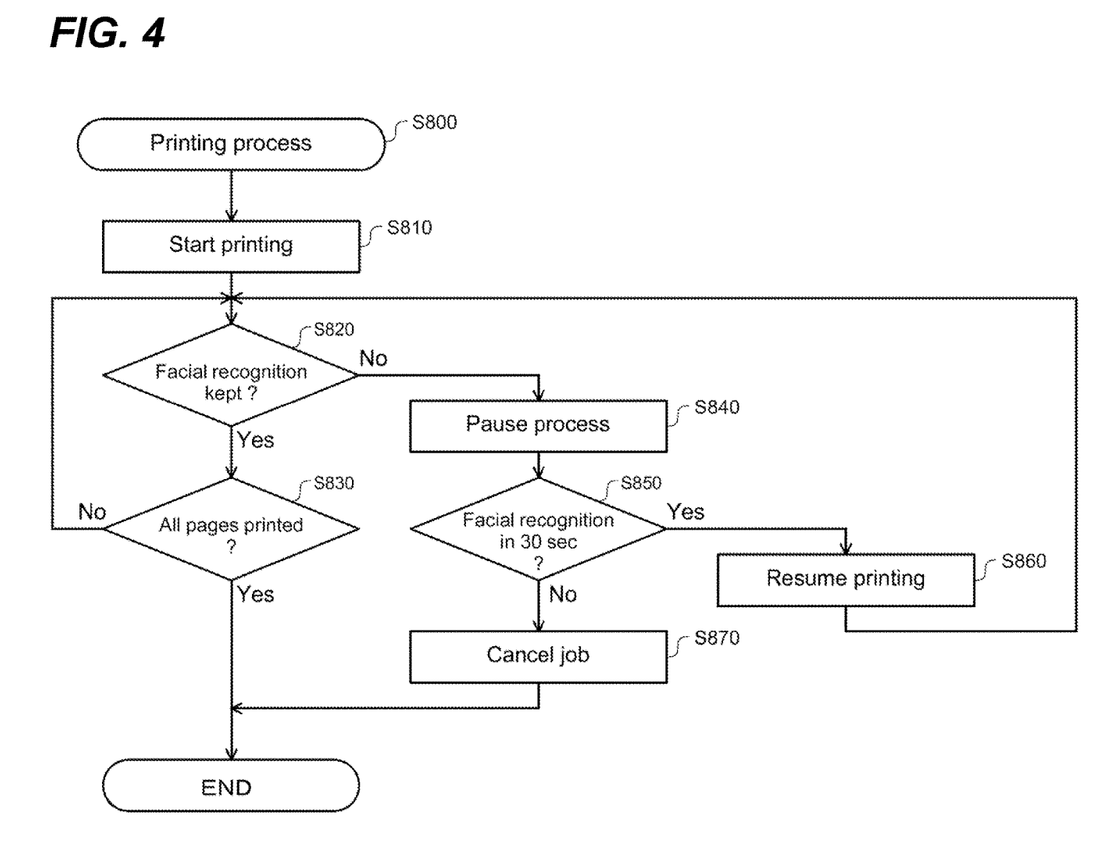
FIG. 4 illustrates a flow chart representing a printing process according to a first embodiment.

FIG. 4 illustrates a flow chart representing a printing process according to a first embodiment. The control unit 110 has been performing the facial recognition using the image acquiring unit 170.

At Step S820, the control unit 110 determines whether the facial recognition is being kept or not. While the facial recognition is being kept, the control unit 110 advances the process to Step S830. If the facial recognition is not being kept or failed, the control unit 110 advances the process to Step S840.

At Step S830, the control unit 110 performs the print job until all the pages are printed. At Step S840, the control unit 110 pauses the process and then advances the process to Step S850.

At Step S850, the control unit 110 attempts the facial recognition again and causes the smartphone 201 to perform the push notification for User A to return in front of the image forming apparatus 101. If the control unit 110 succeeds in the facial recognition within a predetermined time, which is 30 seconds in this case, the control unit 110 resumes the printing (Step S860). If the control unit 110 failed the facial recognition within the predetermined time, the control unit 110 cancels the print job (Step S870).

The predetermined time may vary depending on security level. The higher the security level is, the shorter the predetermined time becomes. The security level may be adjusted based on the content of the print job. If the document to be printed includes personal information, such as a result of medical examination, financial information, such as bank account and credit card number, and/or signature, the image forming apparatus may adjust the security levels to be a high level. The content of the document may be analyzed using an optical character recognition (OCR) and security data base in the server 400.

As described above, the image forming system 10 according to the first embodiment ensures the output of printed matter privately for its job owner while the facial recognition is being kept. The image forming system 10 also ensures the streamlined procedure including: switching operating modes from the power saving operating mode to the ordinary operating mode in response to the matching of the print job tickets, the push notification by the smartphone 201, and automatic start of the printing in response to the facial recognition. This ensures the output of printed matter privately for its job owner and the reduced workload of the user.

B. Second Embodiment

Figure 5:
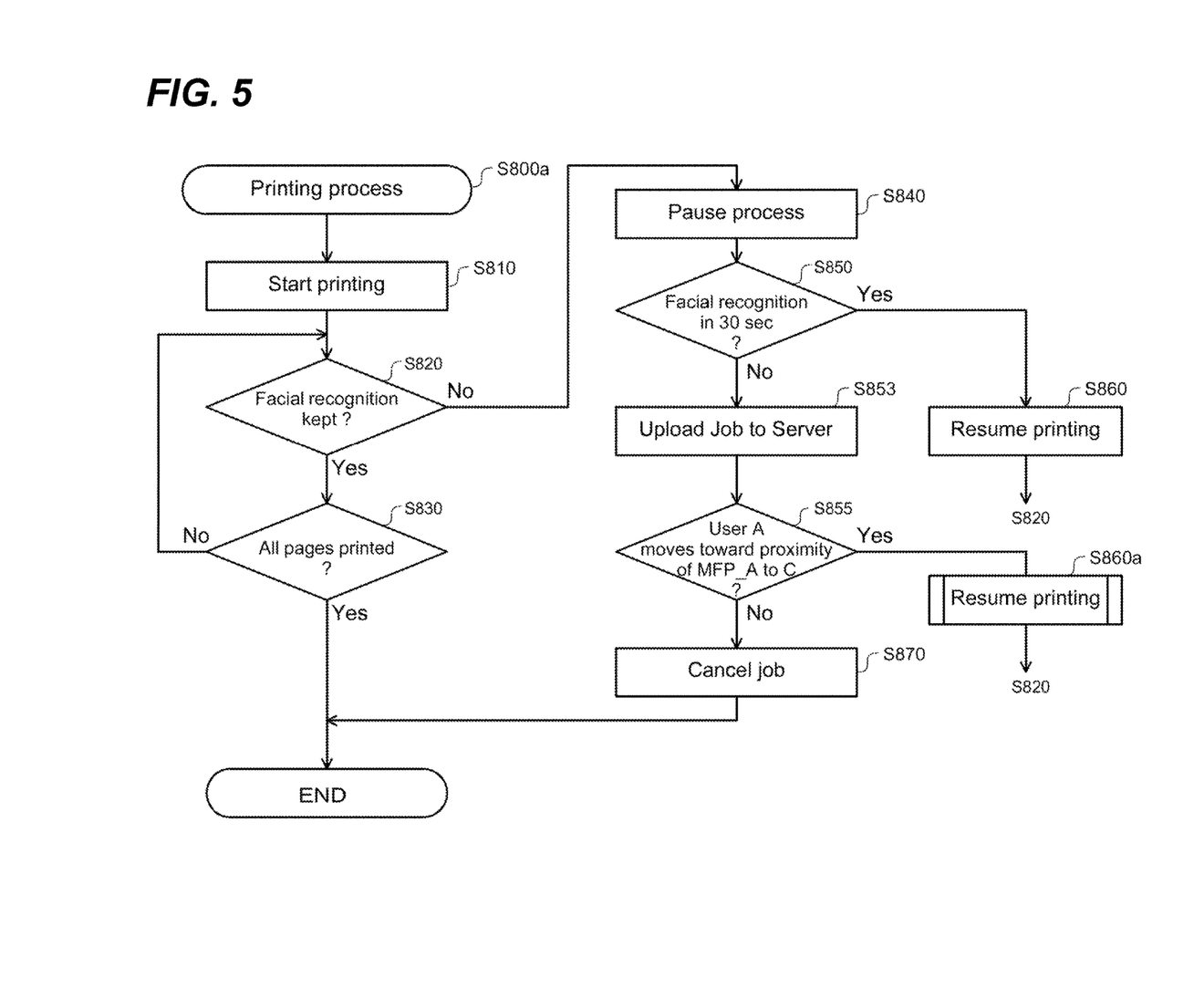
FIG. 5 illustrates a flow chart representing a printing process according to a second embodiment.

FIG. 5 illustrates a flow chart representing a printing process according to a second embodiment. The printing process according to the second embodiment is different from the printing process according to the first embodiment in that the user is allowed to change the image forming apparatuses 100 in the middle of the print job processing. Step S853, Step S855, and Step S860*a* are added after Step S850.

While the print job is cancelled in the first embodiment if the control unit 110 failed the facial recognition within the predetermined time, the control unit 110 according to the second embodiment advances the process to Step 853 instead of cancelling the print job.

At Step S853, the control unit 110 uploads the print job to the server 400 via the LAN. Then, the print job becomes available for not only MFP_A but also MFP_B and MFP_C. MFP_A is the image forming apparatus 101, MFP_B is the image forming apparatus 102, and MFP_C is the image forming apparatus 103.

At Step S855, User A with the smartphone 201 moves toward any of the image forming apparatuses 101 to 103. When User A moves in a specified range from the image forming apparatus 102 and the image forming apparatus 102 is determined to become closest to the smartphone 201, the smartphone 201 automatically log in the image forming apparatus 102 and then transmits the print job ticket, which is transmitted from the personal computer 301, to the image forming apparatus 102.

The image forming apparatus 102 is determined to become closest by the server 400 using values of received signal strength indicator (RSSI) of the image forming apparatuses 101 to 103. In this case, the value of RSSI of the image forming apparatus 102 is larger than the value of RSSI of the image forming apparatus 101 while the value of RSSI of the image forming apparatus 103 is not available. Then, the server 400 determines that the image forming apparatus 102 is the closest image forming apparatus. The value of RSSI may also be used for controlling timing for the control unit 110 to switch the operating modes for the predetermined times varied depending on the security level.

The specified range is a range where the smartphone 201 is connectable to the image forming apparatus 102 via the wireless communication. The server 400 receives the print job ticket from the smartphone 201 via the image forming apparatus 102 and the LAN.

Figure 6:
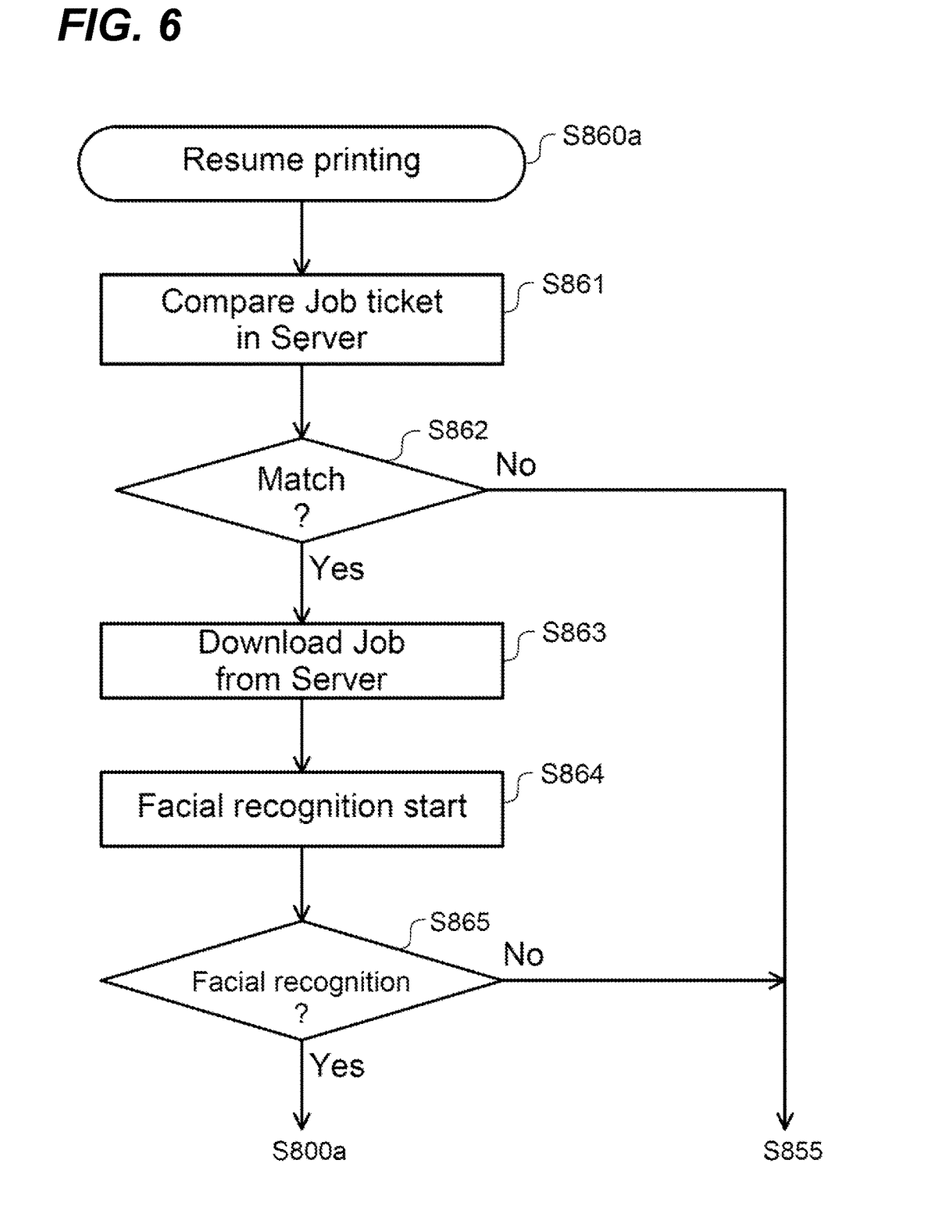
FIG. 6 illustrates a flow chart representing a resume printing process according to the second embodiment.

FIG. 6 illustrates a flow chart representing a resume printing process according to the second embodiment. At Step S861, the server 400 compares the print job ticket from the smartphone 201 with the print job ticket transmitted from the personal computer 301. If the print job ticket from the smartphone 201 matches the print job ticket transmitted from the personal computer 301, the server 400 advances the process to Step S863 (Step S862). If the print job ticket from the smartphone 201 does not match the print job ticket transmitted from the personal computer 301, the control unit 110 returns the process to Step S855 (Step S862).

At Step S863, the server 400 causes the image forming apparatus 102 to download the print job from the server 400. Then, the image forming apparatus 102 has the print job in queue. At Step S864, the image forming apparatus 102 attempt the facial recognition again. If the control unit 110 of the image forming apparatus 102 succeeds in the facial recognition within a predetermined time, which is 5 minutes in this case, the control unit 110 advances the process to Step 800*a* (see FIG. 5) to resume the printing using the downloaded print job (Step S865). If the control unit 110 of the image forming apparatus 102 failed the facial recognition within the predetermined time, the control unit 110 returns the process to Step S855. The predetermined time may vary depending on security level.

As described above, the image forming system 10 according to the second embodiment allows the user to change the image forming apparatuses 100 to print in the middle of the print job processing. This ensures the flexibility of use of the image forming apparatuses 100. The server the server 400 may causes the smartphone 201 to perform the push notification in the second embodiment to show the updated availability of the print job and the image forming apparatuses the image forming apparatuses 101 to 103.

C. Modifications

The disclosure will not be limited to respective embodiments described above, but modifications as follows are also possible.

Modification 1

While in the above-described embodiment the facial recognition is employed to confirm the existence of the print job owner to ensure the privately outputting printed matter. However, this should not be construed in limited sense. Measuring a distance between the image forming apparatus and the job owner using a value of the received signal strength indicator (RSSI) is also available. Specifically, the smartphone reads the value of RSSI and compares an average RSSI received at 1 meter distance with the actual RSSI so as to determine the user is within 1 meter of the image forming apparatus. The facial recognition corresponds to this determination.

Modification 2

The RSSI may also be employed for initiating the facial recognition. Specifically, the facial recognition may be initiated when the smartphone reads the value of RSSI and compares an average RSSI received at a couple of meters distance with the actual RSSI so as to determine the facial recognition to be initiated.

Modification 3

While in the above-described embodiment the smartphone is employed as a mobile terminal. However, this should not be construed in limited sense. Any mobile terminal is employed instead of the smartphone insofar as the mobile terminal is connectable via a wireless communication.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. In an image forming system made up of an image forming apparatus having a storage unit storing user facial images in association with storage-unit recorded users, and a camera for acquiring a facial image of a user in front of the image forming apparatus, of a personal-computer terminal network-connected to the image-forming apparatus via a server, and of a mobile terminal enabled for wireless-communication connection to the image forming apparatus, an image forming method comprising:
in the personal-computer terminal, creating as a data file a private-print job ticket containing information selecting the image forming apparatus, and job-ticket-owner user ID data identifying the user as recorded in the image-forming-apparatus storage unit;
sending a print job including imaging data and a first copy of the print job ticket from the personal-computer terminal to the image forming apparatus, and sending a second copy of the print job ticket from the personal-computer terminal to the mobile terminal;
in the image forming apparatus, receiving the print job and the first copy of the print job ticket, and in the mobile terminal receiving the second copy of the print job ticket;
with the mobile terminal being within wireless communication range from the image forming apparatus, causing the mobile terminal to transmit the second copy of the print job ticket to the image forming apparatus, and logging the mobile terminal in to the image forming apparatus by authenticating the mobile-terminal user in the image forming apparatus using the user ID data in the second copy of the print job ticket;
in the image forming apparatus, comprising the first and second copies of the print job ticket, and if the copies match, sending an instruction to the mobile terminal to prompt the mobile-terminal user to stand in front of the image forming apparatus;
acquiring through the camera a facial image of the mobile-terminal user standing in front of the image forming apparatus;
in the image forming apparatus, recognizing in the acquired facial image, based on the user facial images stored in the storage unit, the face of the mobile-terminal user as the job-ticket-owner user, for causing the image forming apparatus to start outputting the print job; and
in the image forming apparatus, performing the print job on the imaging data only while the facial image is being recognized.

2. The method according to claim 1, wherein the printing includes:
suspending the printing of the image data and starting measuring time if the recognizing loses the face of the owner; and
resuming the printing of the image data if the recognizing recognizes the face of the owner again within a specified time from the loss of the face of the owner.

3. The method according to claim 1, wherein:
the image forming apparatus has a power saving operating mode and an ordinary operating mode, the power saving operating mode consuming a less power than the ordinary operating mode; and
the authenticating includes switching from the power saving operating mode to the ordinary operating mode in response to the authenticating using the user ID data.

4. The method according to claim 1, further comprising:
notifying, at the mobile terminal, the owner whose print job ticket is printable at the image forming apparatus close to the owner by push notification; and
displaying a user interface screen on the mobile terminal to cause to start the acquiring.

5. The method according to claim 1, wherein the sending includes:
recognizing a string of characters representing a predetermined word related to confidentiality in the image data; and
automatically containing the user ID data if the predetermined word is recognized in the image data.

6. The method according to claim 1, wherein the sending includes:
recognizing a string of characters representing a predetermined word related to confidentiality in the image data; and
automatically containing the user ID data if the predetermined word is recognized in the image data.

7. An image forming system comprising:
an image forming apparatus having a storage unit storing user facial images in association with storage-unit recorded users, and a camera for acquiring a facial image of a user in front of the image forming apparatus;
a personal-computer terminal network-connected to the image-forming apparatus via a server;
a mobile terminal enabled for wireless-communication connection to the image forming apparatus;
one or more processors; and
a non-transitory data storage storing computer-readable instructions that, when executed by the one or more processors, cause the image forming system to perform functions comprising
in the second-computer terminal, creating as a data file a private-print job ticket containing information selecting the image forming apparatus, and jobticket-owner user ID data identifying the user as recorded in the image-forming apparatus storage unit, sending a print job including imaging data and a first copy of the print job ticket from the personal-computer terminal to the image forming apparatus, and sending a second copy of the print job ticket from the personal-computer terminal to the mobile terminal, in the image forming apparatus, receiving the print job and the first copy of the print job ticket, and in the mobile terminal receiving the second copy of the print job ticket, with the mobile terminal being within wireless communication range from the image forming apparatus, causing the mobile terminal to tranmit the second copy of the print job ticket to the image forming apparatus, and logging the mobile terminal in to the image forming apparatus by authenticating the mobile-terminal user in the image forming apparatus using the user ID data in the second copy of the print job ticket, in the image forming apparatus, comparing the first and second copies of the print job ticket, and if the copies match, sending an instruction to the mobile terminal to prompt the mobile-terminal user to stand in front of the image forming apparatus, acquiring through the camera a facial image of the mobile-terminal user standing in front of the image forming apparatus, in the image forming apparatus, recognizing in the acquired facial image, based on the user facial images stored in the storage unit, the face of the mobile-terminal user as the job-ticket-owner user, for causing the image forming apparatus to print the image data, and in the image forming apparatus, performing the print job on the imaging data only while the facial image is being recognized.

8. The image forming system according to claim 7, wherein the printing includes:
  suspending the printing of the image data and starting measuring time if the recognizing loses the face of the owner; and
  resuming the printing of the image data if the recognizing recognizes the face of the owner again within a specified time from the loss of the face of the owner.

9. The image forming system according to claim 7, wherein:
  the image forming apparatus has a power saving operating mode and an ordinary operating mode, the power saving operating mode consuming a less power than the ordinary operating mode; and
  the authenticating includes switching from the power saving operating mode to the ordinary operating mode in response to the authenticating using the user ID data.

10. The image forming system according to claim 7, further performing functions comprising:
  notifying, at the mobile terminal, the owner that the print job ticket is printable at the image forming apparatus close to the owner by push notification; and
  displaying a user interface screen on the mobile terminal to cause to start the acquiring.

11. For an image forming system made up of an image forming apparatus having a storage unit storing user facial images in association with storage-unit recorded users, and a camera for acquiring a facial image of a user in front of the image forming apparatus, of a personal-computer terminal network-connected to the image-forming apparatus via a server, and of a mobile terminal enabled for wireless-communication connection to the image forming apparatus, a non-transitory computer-readable recording medium storing computer-readable instructions that, when executed by one or more processors, cause the image forming system to execute:
  in the personal-computer terminal, creating as a data file private-print job ticket containing information selecting the image forming apparatus, and job-ticket-owner user ID data identifying the user as recorded in the image-forming-apparatus storage unit;
  sending a print job including imaging data and a first copy of the print job ticket from the personal-computer terminal to the image forming apparatus, and sending a second copy of the print job ticket from the personal-computer terminal to the mobile terminal;
  in the image forming apparatus, receiving the print job and the first copy of the print job ticket, and in the mobile terminal receiving the second copy of the print job ticket;
  with the mobile terminal being within wireless communication range from the image forming apparatus, causing the mobile terminal to transmit the second copy of the print job ticket to the image forming apparatus, and logging the mobile terminal in to the image forming apparatus by authenticating the mobile-terminal user in the image forming apparatus using the user ID data in the second copy of the print job ticket;
  in the image forming apparatus, comparing the first and second copies of the print job ticket, and if the copies match, sending an instruction to the mobile terminal to prompt the mobile-terminal user to stand in front of the image forming apparatus;
  acquiring through the camera a facial image of the mobile-terminal user standing in front of the image forming apparatus;
  in the image forming apparatus, recognizing in the acquired facial image, based on the user facial images stored in the storage unit, the face of the mobile-terminal user as the job-ticket-owner user, for causing the image forming apparatus to print the image data; and
  in the image forming apparatus, performing the print job on the imaging data only while the facial image is being recognized.

12. The recording medium according to claim 11, wherein the printing includes:
  suspending the printing of the image data and starting measuring time if the recognizing loses the face of the owner; and
  resuming the printing of the image data if the recognizing recognizes the face of the owner again within a specified time from the loss of the face of the owner.

13. The recording medium according to claim 11, wherein:
  the image forming apparatus has a power saving operating mode and an ordinary operating mode, the power saving operating mode consuming a less power than the ordinary operating mode; and
  the authenticating includes switching from the power saving operating mode to the ordinary operating mode in response to the authenticating using the user ID data.

14. The recording medium according to claim 11, further causing the image forming system to execute:

notifying, at the mobile terminal, the owner that the print job ticket is printable at the image forming apparatus close to the owner by push notification; and displaying a user interface screen on the mobile terminal to cause to start the acquiring.

15. The recording medium according to claim 11, wherein the sending includes:

recognizing a string of characters representing a predetermined word related to confidentiality in the image data; and automatically containing the user ID data if the predetermined word is recognized in the image data.

* * * * *